JOHN DISTERDICK.
Improvement in Dumping-Cars.
No. 126,036.            Patented April 23, 1872.
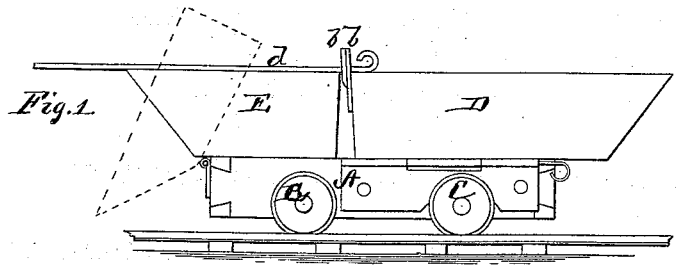
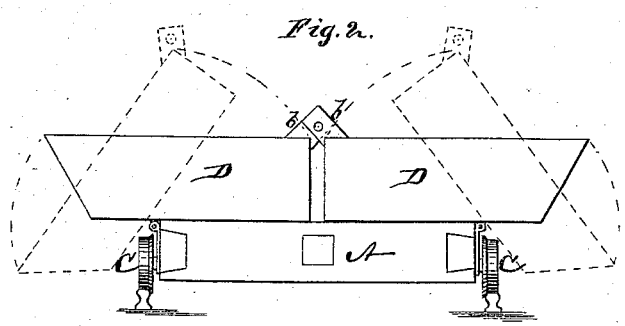
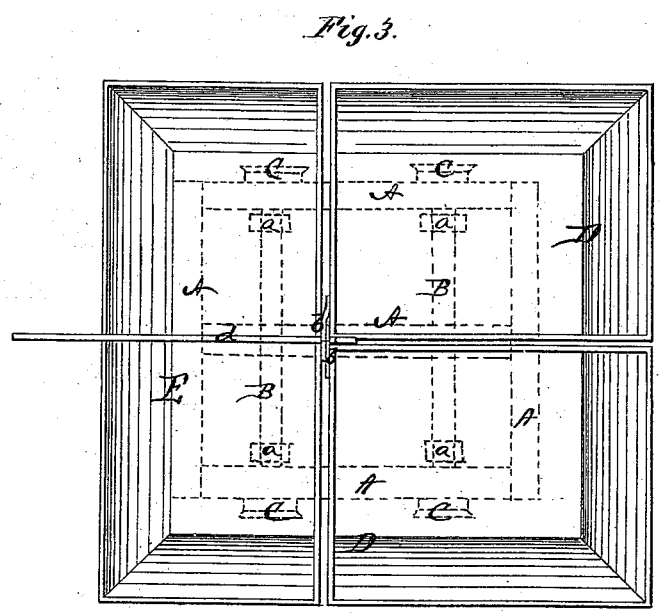
Witnesses:
Henry N. Miller
C. L. Evert.
Inventor
John Disterdick.
per Alexander Mash
Attorneys.

UNITED STATES PATENT OFFICE.

JOHN DISTERDICK, OF KELLY'S MILLS, OHIO.

IMPROVEMENT IN DUMPING-CARS.

Specification forming part of Letters Patent No. 126,036, dated April 23, 1872.

*To all whom it may concern:*

Be it known that I, JOHN DISTERDICK, of Kelly's Mills, in the county of Lawrence and in the State of Ohio, have invented certain new and useful Improvements in Dumping - Car; and do hereby declare that the following is a full, clear, and exact description thereof, reference being had to the accompanying drawing and to the letters of reference marked thereon making a part of this specification.

The nature of my invention consists in the construction and arrangement of a "dumping-car" having boxes so as to dump on three sides, as will be hereinafter more fully set forth.

In order to enable others skilled in the art to which my invention appertains to make and use the same, I will now proceed to describe its construction and operation, referring to the annexed drawing, in which—

Figure 1 is a side elevation; Fig. 2, an end view; and Fig. 3, a plan view of my dumping-car.

A represents the frame or truck of my car, made of five pieces of timber, and to which the axles B B are to be secured in cast-iron boxes bolted to the frame. The wheels C C are to be small and cast solid, or nearly so, and keyed on wrought-iron axles B B, which are, near each end, provided with a rim or shoulder, *a*, so as to prevent them from slipping sidewise. D D and E are the boxes or receptacles for whatever articles are desired to be moved in these cars, arranged, as shown, so that the boxes D D can tip over or dump one on each side, and the box E at the end of the car. They should be made of well-seasoned timber, in the manner shown, flaring outward, and held to the frame by any suitable hinges. The boxes or beds D D and E may be held on the frame by any suitable means—for instance, ears *b b*, with a rod, *d*, passing through holes in the same far enough to extend over the edge of the third box. By withdrawing this rod the boxes are then easily dumped.

Having thus fully described my invention, what I claim as new, and desire to secure by Letters Patent, is—

1. A dumping-car having three separate and distinct dumping-boxes, one on each side and one at the end, substantially as herein set forth.

2. The combination of a car-truck, A, with axles B B and wheels C C and the dumping-boxes D D and E, constructed and arranged substantially as herein set forth.

In testimony that I claim the foregoing I have hereunto set my hand this 1st day of November, 1871.

JOHN DISTERDICK.

Witnesses:
 JAMES H. WILLIAMS,
 LEWIS MORGAN.